United States Patent [19]
Rangan et al.

[11] Patent Number: 5,946,462
[45] Date of Patent: Aug. 31, 1999

[54] STATION MANAGEMENT CIRCUIT

[75] Inventors: Geetha N.K. Rangan, Cupertino;
Ramesh Sivakolundu, Fremont, both of Calif.

[73] Assignee: Advanced Micro Devices, Inc., Sunnyvale, Calif.

[21] Appl. No.: 08/727,029

[22] Filed: Oct. 8, 1996

[51] Int. Cl.$^6$ .................................................. G06F 11/00
[52] U.S. Cl. ................................ 395/185.02; 395/183.15
[58] Field of Search .......................... 395/183.15, 183.13, 395/183.16, 183.19, 183.01, 185.01, 185.02, 200.54, 200.57, 200.6, 200.66, 200.68, 184.01; 371/20.1, 20.2, 20.4, 20.5, 20.6, 34

[56] References Cited

U.S. PATENT DOCUMENTS

| | | | |
|---|---|---|---|
| 4,142,070 | 2/1979 | Landauer et al. | 179/15 BS |
| 4,764,863 | 8/1988 | Silverthorn, III et al. | 395/183.15 |
| 5,097,469 | 3/1992 | Douglas | 371/20.1 |
| 5,224,096 | 6/1993 | Onishi et al. | 370/85.5 |
| 5,293,375 | 3/1994 | Moorwood et al. | 370/13.1 |
| 5,347,524 | 9/1994 | I'Anson et al. | 395/183.15 |
| 5,524,052 | 6/1996 | Augustine et al. | 380/49 |
| 5,553,302 | 9/1996 | Morrissey et al. | 395/825 |
| 5,579,476 | 11/1996 | Cheng et al. | 395/183.15 |
| 5,594,869 | 1/1997 | Hawe et al. | 395/200.2 |
| 5,638,512 | 6/1997 | Osman et al. | 395/187.01 |
| 5,664,105 | 9/1997 | Keisling et al. | 395/200.54 |
| 5,673,254 | 9/1997 | Crayford | 370/231 |
| 5,699,366 | 12/1997 | Ono | 371/32 |
| 5,754,540 | 5/1998 | Liu et al. | 370/315 |

*Primary Examiner*—Joseph E. Palys
*Attorney, Agent, or Firm*—Fliesler, Dubb, Meyer & Lovejoy LLP

[57] ABSTRACT

A management frame circuit has a set of inputs coupleable to a management bus for carrying management frames. Upon receiving the management frames from the management bus, the management frame circuit determines whether each of the management frames conforms to a frame template. The management frame circuit then asserts an indication that a management frame is bad, if the management frame is determined to not conform to the frame template. The bad fame indication is later deasserted in response to recognition of a predetermined set of bits on the management bus.

22 Claims, 6 Drawing Sheets

STATION MANAGEMENT CIRCUIT

BACKGROUND OF THE INVENTION

1. Field of the Invention

The present invention is directed towards the field of communications network management. More particularly, the present invention relates to processing management frames transmitted between a physical layer device and a station management entity.

2. Description of the Related Art

Communications networks provide for the transfer of information between pieces of data terminal equipment, such as personal computers. One standard for a communications network is the Institute of Electrical and Electronics Engineers ("IEEE") 802.3u standard, which is set forth in *IEEE Standards for Local and Metropolitan Area Networks: Supplement to Carrier Sense Multiple Access with Collision Detection (CSMA/CD) Access Method and Physical Layer Specifications, Media Access Control (MAC) Parameters, Physical Layer, Medium Attachment Units, and Repeater for 100 Mb/s Operation, Type 100BASE-T (Clauses 21–30)*, The Institute of Electrical and Electronics Engineers, Inc., 345 East 47th Street, New York, N.Y. 10017-2394, 1995, which is hereby incorporated by reference.

A communications network may be required to transfer a great deal of information. Under heavy utilization conditions, a communications network's performance may be degraded, or the communications network may cease operating. By continually monitoring the operation of a communications network, it may be possible for a network management entity to detect the potential for such degradations and failures. The network management entity can then take actions that will assist in avoiding any degradations or failures. In order to provide a network management entity with the information necessary to manage a communications network, different components in the communications network may record network status information and make it available to the network management entity.

Figure 1:
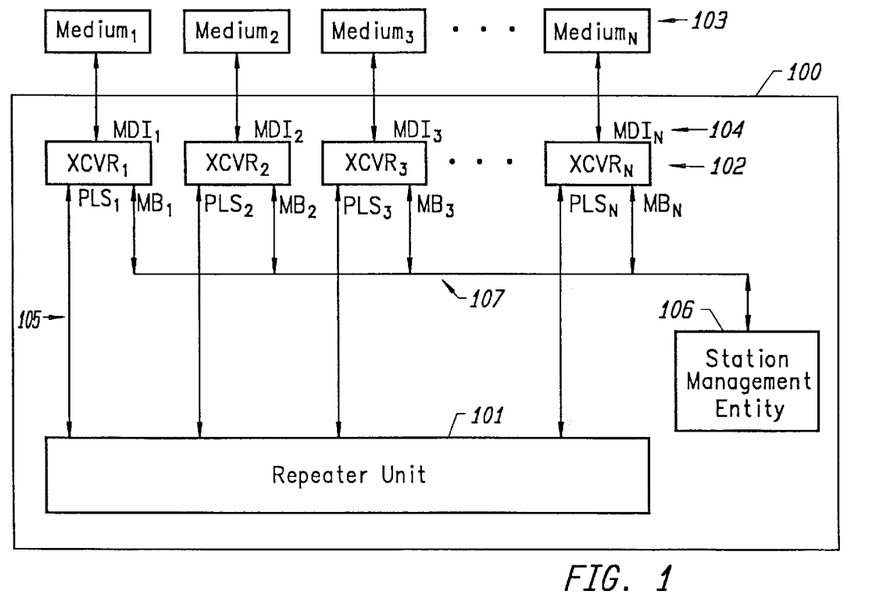
FIG. 1 illustrates a repeater set including a repeater unit, station management entity, and a plurality of transceivers.

FIG. 1 illustrates a repeater set 100, as specified in the IEEE 802.3u standard, including a station management entity 106, which is also identified in the IEEE 802.3u standard. The repeater set 100 provides for the transfer of information between multiple medium connections in an IEEE 802.3u communications network.

The repeater set 100 includes a repeater unit 101 and a plurality of transceivers 102. Each transceiver 102 may be coupled to a respective medium 103 that carries information through the network. Each transceiver 102 is coupled to a respective medium 103 via a medium dependent interface ("MDI") 104 that is specified in the IEEE 802.3u standard. Each medium 103 is also attached to either data terminal equipment (not shown), another repeater set (not shown), or another piece of networking equipment (not shown), such as a bridge or a router. Each transceiver 102 receives and transmits data over its respective MDI 104.

Each transceiver 102 is coupled to the repeater unit 101 through a medium independent interface ("MII") as specified in the IEEE 802.3u standard. The MII includes a set of physical signaling sublayer signals ("PLS") 105 for connecting the transceiver to the repeater unit 101. The PLS signals 105 provide for transmit data to be passed from the repeater unit 101 to the transceiver 102, receive data to be passed from the transceiver 102 to the repeater unit 101, and for carrier and collision signals to be passed to the repeater unit 101 by the transceiver 102.

The MII also includes a management bus ("MB") 107, which is employed to couple a station management entity 106 to a set of transceivers 102. Each transceiver 102 may internally maintain a set of network status information, including information relating to the operation of the link between the transceiver 102 and its respective medium 103. Each transceiver 102 may also include a control register and other various registers that are programmable and readable by the station management entity 106.

The station management entity 106 retrieves such network status information and accesses transceiver registers via the management bus 107. The station management entity 106 thereby provides a means for a network administrator to gather network status information and program the operation of transceivers 102 to avoid future network degradations and failures.

The station management entity 106 communicates with each transceiver 102 coupled to the management bus 107 through the use of management frames. However, if a management frame deviates from the frame template specified in the IEEE 802.3u standard, a transceiver 102 may receive erroneous instructions, thereby causing the transceiver 102 to perform an erroneous operation. For example, an improper management frame may cause two transceivers 102 to erroneously believe that they are designated to drive the shared management bus 107. As a result, there may be contention on the management bus 107 and the network administrator may either receive erroneous data or have an instruction executed improperly.

SUMMARY OF THE INVENTION

The present invention includes a management circuit that can monitor a management bus to determine whether a management frame is in conformance with the required management frame template. Further, the management circuit responds to the detection of a non-conforming bad management frame by signaling a transceiver to not perform operations in response to the bad management frame. The management circuit later signals the transceiver to respond to a conforming good management frame that follows the bad management frame.

The management frame signals the transceiver to respond to such a good management frame upon detecting the good management frame's presence on the management bus. As a result, the present invention avoids the use of an additional dedicated input on either the management circuit or the transceiver to reactivate the transceiver, after operations in response to a bad management frame have been halted. Deactivation of transceiver operations in response to a bad management frame may be accomplished in the present invention by indicating to the transceiver to not drive one or more data lines connected to the management bus.

A good management frame following a bad management frame is recognized by its preamble, which may be for example 32 consecutive logic 1's. No designation of a specific management circuit is required in the preamble or otherwise, should more than one management circuit be coupled to the management bus.

BRIEF DESCRIPTION OF THE DRAWINGS

Further details of the present invention are explained with the help of the attached drawings in which.

DETAILED DESCRIPTION

Figure 2:
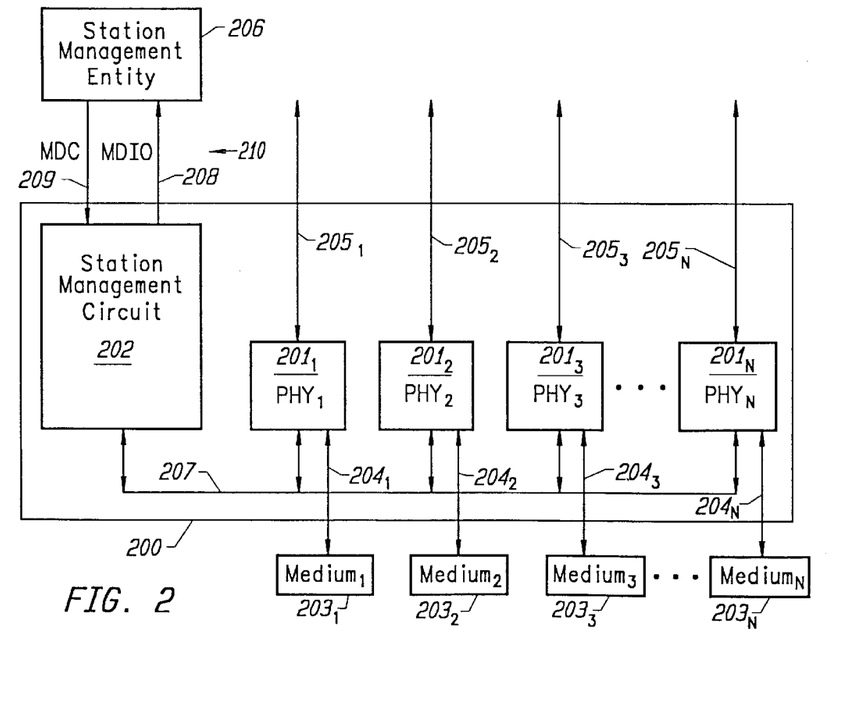
FIG. 2 illustrates a transceiver, including a plurality of physical layer devices and a station management circuit, in accordance with the present invention.

FIG. 2 illustrates a transceiver 200 in accordance with the present invention. The transceiver 200 includes physical layer devices $201_{1-N}$ and a station management circuit 202. Each physical layer device $201_{1-N}$ provides a set of PLS signals $205_{1-N}$ for the MII for interfacing to a repeater unit (not shown) or a media access controller (not shown) through a reconciliation layer (not shown). Each physical layer device $201_{1-N}$ also provides an MDI interface $204_{1-N}$ for coupling to a respective medium $203_{1-N}$, such as category 5 unshielded twisted pair cable. Each physical layer device $201_{1-N}$ transfers data between the PLS signals $205_{1-N}$ and the MDI $204_{1-N}$ in accordance with one of the physical layer device operational specifications set forth in the IEEE 802.3u standard.

Each physical layer device $201_{1-N}$ and the station management circuit 202 are all coupled to a bus 207. The bus 207 provides a means for each physical layer device $201_{1-N}$ to provide network status information to the station management circuit 202. The bus 207 also provides a means for the station management circuit 202 to provide instructions to each physical layer device $201_{1-N}$, based on the data that is programmed into the station management circuit 202 by a network administrator.

The station management circuitry 202 may be coupled to a station management entity 206 via a management bus 210 which includes a management data input/output signal ("MDIO") 208 and a management data clock signal ("MDC") 209. The management bus 210 may be shared by a plurality of transceivers. The MDIO 208 is a bidirectional signal that can be driven by either the station management circuit 202 or the station management entity 206. In order to avoid contention on the MDIO 208, only one entity may drive the MDIO 208 at any instance. The remaining entities coupled to the MDIO 208 provide a tri-state output and treat the MDIO 208 as an input.

The MDC 209 is only driven by the station management entity. Each entity coupled to the MDIO 208 and MDC 209 signals uses the rising edge of the clock signal on MDC 209 to sample the MDIO 208. MDC 209 and MDIO 208 may be provided by the station management entity 206, so that the MDIO 208 is valid 10 nanoseconds before the rising edge of MDC 209 and 10 nanoseconds after the rising edge of MDC 209.

Figure 3:
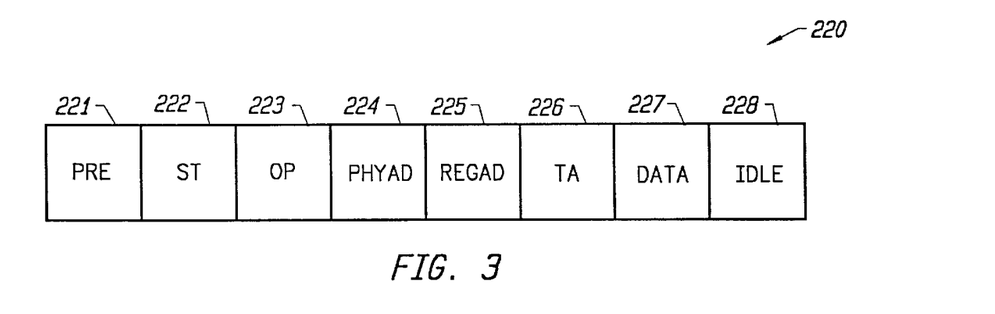
FIG. 3 illustrates a frame template for a management frame conforming to the IEEE 802.3u standard.

Data is transferred on the MDIO 208 in the form of management frames. FIG. 3 illustrates the frame template for a valid management frame 220 that is transferred over the MDIO 208 in accordance with the IEEE 802.3u standard. The management frame 220 consists of 8 fields. The first field is the preamble field ("PRE") 221. The preamble field 221 consists of 32 contiguous bits having a logic 1 value. The preamble field 221 indicates that the management frame 220 is beginning to be transmitted onto the MDIO 208. The preamble field may be disabled if all of the station management circuits coupled to the MDIO 208 can recognize the beginning of the management frame 208 without being sent a preamble 221.

The second field in the management frame 220 is the start of frame field ("ST") 222. The start of frame field 222 contains two bits. The first bit transmitted onto the MDIO 208 is a logic 0 value, which is followed by a logic 1 value. Some station management circuits may use the ST field 222 to recognize the start of the management frame 220, instead of using the preamble field 221.

The third field in the management frame 220 is the operation code field ("OP") 223. The operation code field 223 provides a bit pattern, which indicates whether the station management entity 206 wishes to read data from the station management circuit 202 or write data to the station management circuit 202. If a read operation is desired, the first bit transferred onto the MDIO 208 will be a logical 1 value, and the second bit will be a logical 0 value. If a write operation is desired, the first bit transferred onto the MDIO 208 will be a logical 0 value, and the second bit will be a logical 1 value.

The fourth field in the management fame 220 is the PHY address field ("PHYAD") 224. The PHYAD field 224 consists of five bits, which serve as an address for the physical layer device for which the management frame 220 is intended. A logic value of 00000 in the PHYAD field indicates that the management frame 220 is intended for all physical layer devices that are coupled to a station management circuit 202 receiving the MDIO 208.

The fifth field in the management frame 220 is the register address field ("REGAD") 225. The REGAD field 225 consists of five bits, which serve as an address for a data storage location associated with the addressed physical layer device. As stated previously, these data storage locations provide for the storage of network status and other information, as well as providing a means for receiving instructions from a network administrator.

The sixth field in the management frame 220 is the turnaround field ("TA") 226. The TA field 226 is a two bit field that provides for the avoidance of contention on the MDIO 208 during a read operation by the station management entity 206. If the operation called for in the OP field 223 is a read, the station management entity 206 and the station management circuit 202 will both provide a high impedance state to the MDIO 208 in the first bit time of the TA field 226. In the second bit time, the station management circuit 202 that is coupled to an addressed physical layer device 201 will drive a logic 0 value onto the MDIO 208. If the operation called for in the OP field 223 is a write, the station management entity 202 will drive a logic 1 value onto the MDIO 208 in the first bit time of the TA field 226. The station management entity 206 will then drive a logic 0 value onto the MDIO 208 for the second bit time.

The seventh field in the management frame is the data field ("DATA") 227. The data field 227 consists of sixteen bits. If the OP field 223 called for a read operation, the data field 227 is provided to the MDIO 208 by the station management circuit 202 coupled to the addressed physical layer device 201. The data field 227 will contain the contents of a data storage location addressed in the REGAD field 225. If the OP field 223 called for a write operation, the data field 227 is provided to the MDIO 208 by the station management entity 206. The data field 227 will contain a value to be stored in a data storage location associated with the addressed physical layer device. The address of the data storage location will correspond to the address in the REGAD field 225.

The eighth field in the management frame 220 is the idle field ("IDLE") 228. The IDLE field 228 is really a condition that exists on the MDIO 208 when none of the aforementioned fields in the management frame are present on the MDIO 208. In the IDLE condition 228, neither the station management entity 206 nor the station management circuitry 202 drive the MDIO 208. Both the station management entity 206 and the station management circuit 202 provide a high impedance state to the MDIO 208, which is coupled to a pull-up resistor (not shown). Also in the IDLE condition 228, the station management entity 206 does not provide a clock signal having rising and falling edges on MDC 209. Only a single pulse is provided on the MDC 209 immediately following the end of the DATA field 227.

Figure 4:
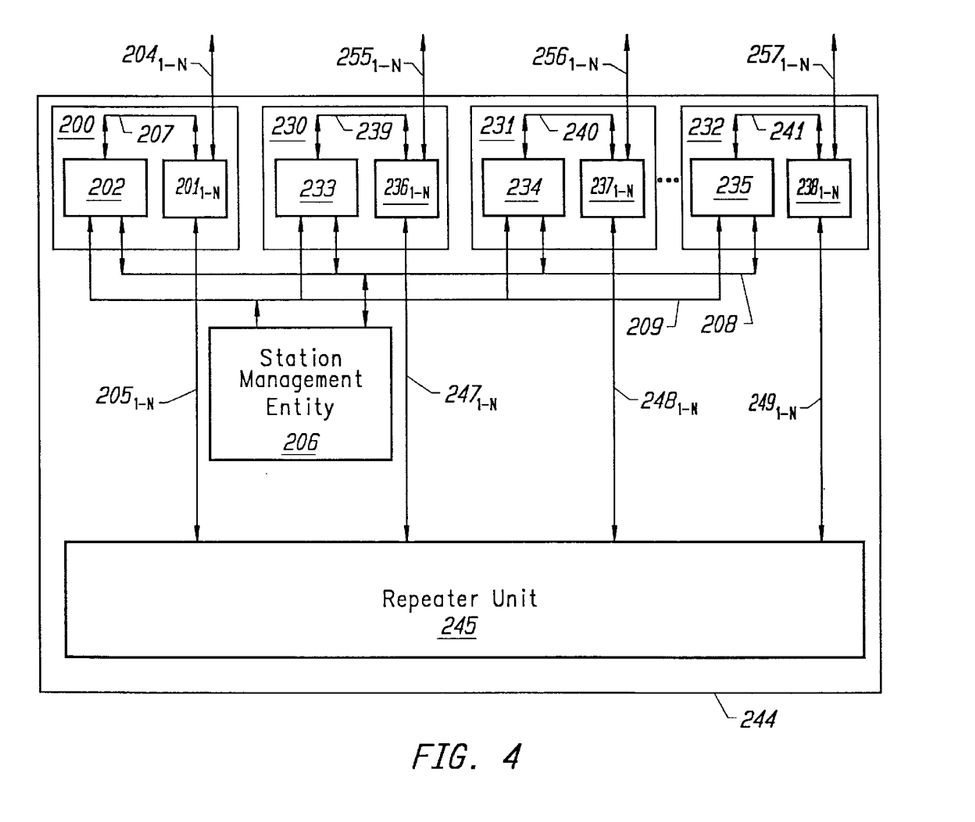
FIG. 4 illustrates a station management entity coupled to a plurality of transceivers, including a transceiver as shown in FIG. 2.

FIG. 4 illustrates a repeater set 244 having an MDIO 208 and MDC 209 coupled to a station management entity 206 and a plurality of transceivers 230, 231, and 232, including the transceiver 200 depicted in FIG. 2. Each of these transceivers 200, 230, 231, and 233 has a station management circuit 202, 233, 234, and 235 coupled to both the MDC 209 and MDIO 208. Each station management circuit 202, 233, 234, and 235 is coupled to a respective set of physical layer devices $201_{1-N}$, $236_{1-N}$, $237_{1-N}$, and $238_{1-N}$ within a transceiver through a respective bus 207, 239, 240, 241.

Each physical layer device in the sets of physical layer devices $201_{1-N}$ $236_{1-N}$, $237_{1-N}$, $238_{1-N}$ is coupled to a repeater unit 245 through a respective set of PLS signals $205_{1-N}$, $247_{1-N}$, $248_{1-N}$, and $249_{1-N}$. Each physical layer device may also be coupled to a respective medium (not shown) via a respective MDI $204_{1-N}$, $255_{1-N}$, $256_{1-N}$, $257_{1-N}$. The number of physical layer devices in each transceiver 200, 230, 231, and 232 may be either one or greater than one. In one embodiment of the present invention, the transceiver 200 includes four physical layer devices $201_{1-N}$.

Figure 5:
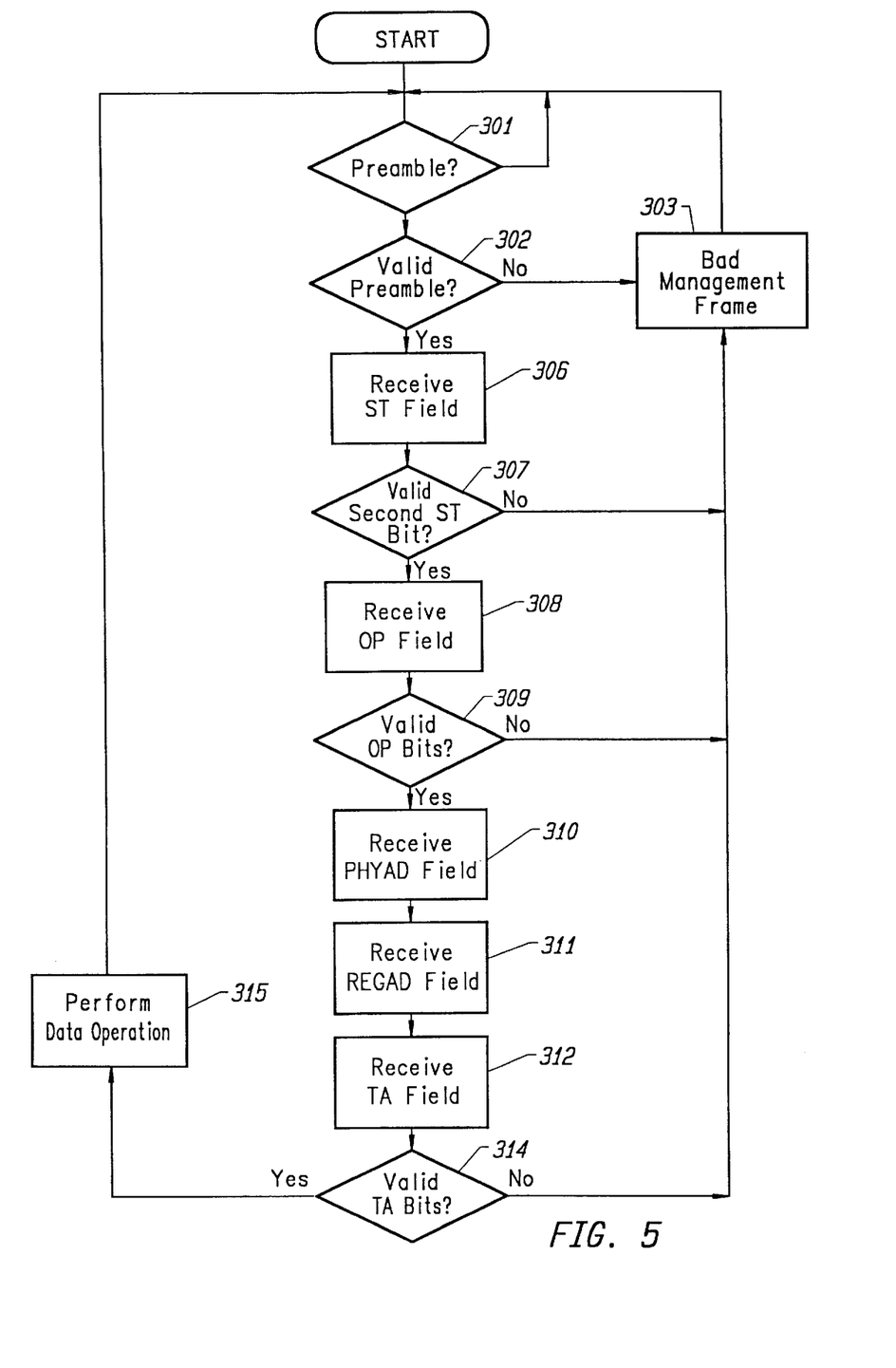
FIG. 5 illustrates a flow diagram of a process of the present invention which may be performed by the station management circuit of FIG. 2.

FIG. 5 illustrates a sequence of process steps in accordance with the present invention that the transceiver 200, including the station management circuit 202 and physical layer devices $201_{1-N}$, may execute when processing management frames. In a preamble detection step 301, the station management circuit 202 monitors MDIO 208 to determine whether a preamble field 221 in a management frame 220 is being transmitted. This may be detected by sensing a clock rising edge on MDC 209 with MDIO 208 being a logic 1 value.

Next, a preamble validity detection step 302 is commenced. In step 302, the station management circuit 202 determines whether the transmitted preamble is valid. This may be achieved by monitoring the preamble field 221 for a logic 0 value. If a logic 0 value is detected in the preamble field 221, the preamble is invalid. If the preamble is invalid, the incoming management frame 220 is determined to not conform to the IEEE 802.3u management frame template, and a bad management frame step 303 is entered. If the preamble is valid, a receive ST bits step 306 is executed. Step 306 provides for the two bits in the ST field 222 to be received by the transceiver 200.

After step 306, a check ST bits step 307 begins. In step 307, the second ST bit is examined. If the second ST bit is a logic 0, the bad management frame step is executed, since a logic 0 in this bit indicates that the incoming management frame 220 does not conform to the IEEE 802.3u management frame template. If the second ST bit is a logic 1, the receive OP field step 308 is executed. In the receive OP field step 308, the transceiver 200 receives the OP field 223 of the incoming management frame 220.

After receiving the OP field, a check OP field step 309 is performed. In step 309, a determination is made of whether the two bits in the OP field 223 are the same. If the two bits are the same, the management frame 220 is not in conformance with the required template, and the bad management frame step 303 is executed. Otherwise, a receive PHYAD step 310 is performed. In step 310, the transceiver 200 receives the PHYAD field 224 of the management frame 220. Next, a receive REGAD step 311 is executed, during which the transceiver 200 receives the REGAD field 225 of the management frame 220.

After receiving the REGAD field 225, a receive TA field step 312 is executed. Step 312 provides for the transceiver 200 to receive the TA field 226 of the management frame 220. After receiving the TA field 226, a check TA field step 314 is commenced. In step 314, the station management circuit 202 determines whether the OP field 223 indicated a write operation and whether the TA field 226 bits are in conformance with the IEEE 802.3u frame template. If a write operation was indicated and the TA field 226 bits are not a logical 10 value, the bad management frame step 303 is executed, because the management frame 220 is not in conformance with the required frame template. Otherwise, a data operation step 315 is executed.

In the data operation step 315, the transceiver 200 performs the operation indicated by the OP field 223 to the register indicated in the REGAD field 225, only if the PHYAD field contains 00000 or the address of one of the physical layer devices $201_{1-N}$ in the transceiver 200. Otherwise, the transceiver 200 waits idly until the sixteen bit times comprising the data field 227 have elapsed. After the data operation step 315 is completed, the preamble detection step 301 is re-executed.

After entering the bad management frame step 303, the transceiver 200 transitions to the detect preamble step 301. This enables the transceiver 200 to stop monitoring the incoming non-conforming management frame and resume the reception of management frames once the next management frame is transmitted by the station management entity 206. As a result, it is not necessary for the station management entity 206 or any other component to provide any special signal to the transceiver 200 to re-enable its ability to receive management frames. In the bad management frame step 303, an indication of the bad management frame may be provided as a statistic for a network administrator.

Figure 6:
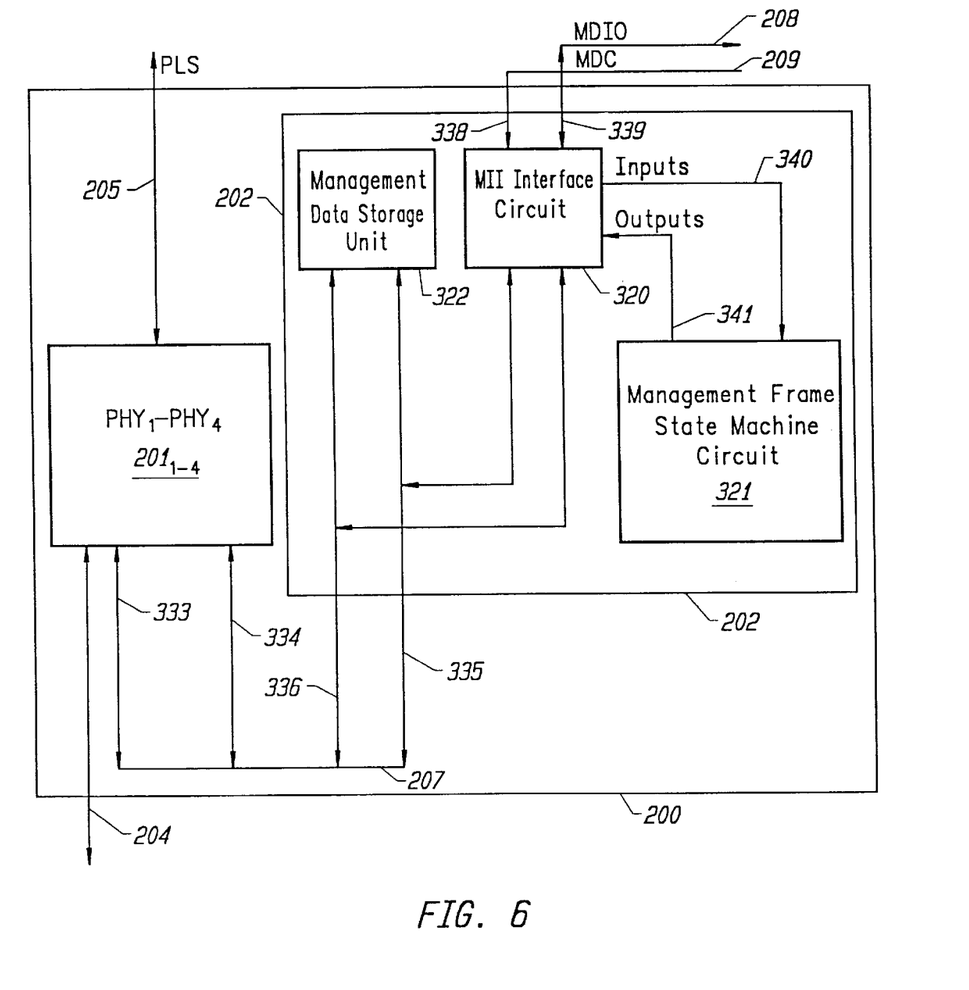
FIG. 6 illustrates more detail of the transceiver of FIG. 2.

FIG. 6 illustrates a more detailed block diagram of transceiver 200, which is capable of performing the process steps shown in FIG. 5. As stated previously, the transceiver 200 includes physical layer devices 201 coupled to a bus 207 and a station management circuit 202 coupled to the bus 207. For purposes of describing the present invention, the transceiver 200 will be described as having four physical layer devices $201_{1-4}$, although different numbers of physical layer devices may be included. As shown in FIG. 6, each physical layer device $201_{1-4}$ is coupled to the bus 207 through a set of PHY data signals 333 and a set of PHY address and control signals 334. The station management circuit 202 is coupled to the bus through a set of management data signals 235 and a set of management address and control signals 336.

The station management circuit 202 includes a MII interface circuit 320, a management data storage unit 322, and a management frame state machine circuit 321. The management data storage unit 322 is coupled to the management address and control signals 336 and the management data signals 335. The management data storage unit 322 contains a plurality of data storage elements, which contain data such as network status information and instructions. The network status information may be obtained from the physical layer devices 201$_{1\text{-}4}$ through the bus 207. The instructions may be received from incoming management frames via the MII interface circuit 320. The management data storage unit 322 may also include data storage elements containing the address of each physical layer device 201$_{1\text{-}4}$. Each data storage element in the management data storage unit 322 has an address, which may be indicated in a REGAD field 225 of a management frame 220.

The MII interface circuit 320 has a MDC input 338 for coupling to the MDC 209 and a MDIO input/output 339 for coupling to the MDIO 208. The MII interface circuit 320 is also coupled to the management address and control signals 336 and the management data signals 335. This enables the MII interface circuit 320 to address the management data storage unit 322 using the bits in a REGAD field 225 and transfer data between the management data storage unit 322 and the MDIO 208.

The MII interface circuit 320 also provides a set of input signals 340 to the management frame state machine 321 and receives a set of outputs 341 provided by the management frame state machine 321. The management frame state machine 321 performs a series of operations to enable the station management circuit 202 to monitor incoming management frames 220 and detect bad management frames, which do not conform to the frame template specified in the IEEE 802.3u standard.

Figure 7:
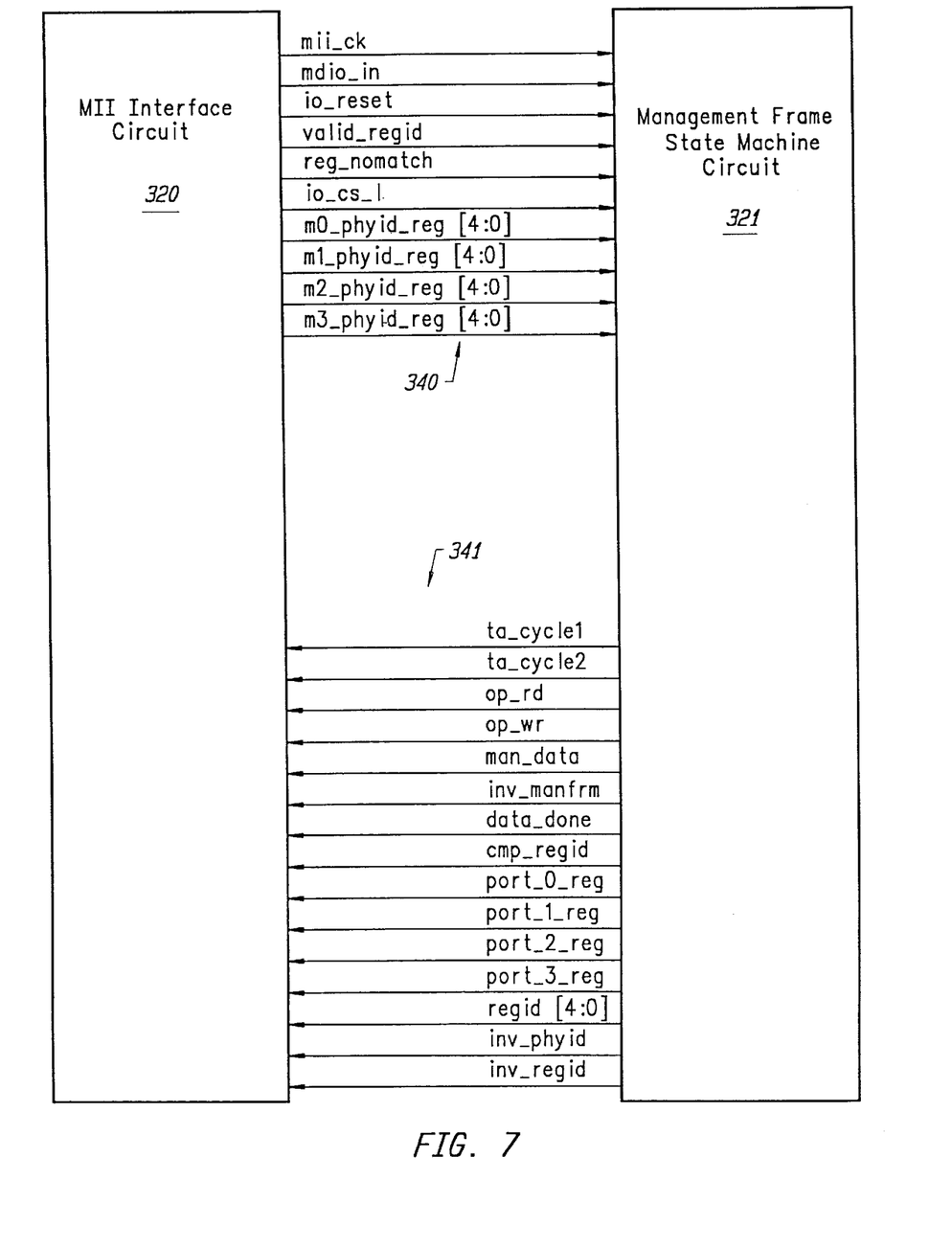
FIG. 7 illustrates an interface between the MII Interface circuitry and the management frame state machine illustrated in FIG. 6.

FIG. 7 provides a more detailed illustration of the interface between the MII interface circuit 320 and the management frame state machine 321. The following provides a description of each of the input signals 340:

| Input | Description |
|---|---|
| mii_clk | Provides the signal being received on the MDC input 338. |
| mdio_in | Provides the signal being received and transmitted on the MDIO input/output 339. |
| io_reset | Provides a reset signal indicating that the station management circuit 202 is being reset. |
| valid_regid | Provides a signal indicating that the REGAD field 225 corresponds to an address of a location in the management data storage unit 322. |
| reg_nomatch | Provides a signal indicating that the REGAD field 225 does not correspond to an address of a location in the management data storage unit 322. |
| io_cs_1 | Provides a signal indicating that the management data storage unit 322 is to be loaded with data on the MDIO input/output 339. |
| m0_phyid_reg[4:0] | Provides the address for the first physical layer device 201$_1$. |
| m1_phyid_reg[4:0] | Provides the address for the second physical layer device 201$_2$. |
| m2_phyid_reg[4:0] | Provides the address for the third physical layer device 201$_3$. |
| m3_phyid_reg[4:0] | Provides the address for the fourth physical layer device 201$_4$. |

One with ordinary skill in the art will recognize that the inputs m0_phyid_reg[4:0] through m3_phyid_reg[4:0] may be expanded or reduced in number depending upon the number of physical layer devices included in the transceiver 200.

The following provides a description of each of the output signals 341:

| Output | Description |
|---|---|
| ta_cycle1 | Asserted when a first bit of a TA field 226 is provided on the MDIO input/output 339. |
| ta_cycle2 | Asserted when a second bit of a TA field 226 is provided on the MDIO input/output 339. |
| op_rd | Asserted when the OP field 223 in the management frame 220 calls for a read operation. |
| op_wr | Asserted when the OP field 223 in the management frame 220 calls for a write operation. |
| man_data | Asserted during the bit times of a data field 227 being provided on the MDIO input/output 339. |
| data_done | Asserted to indicate that the data field 227 is completed. |
| inv_manfrm | Asserted to indicate that the management frame state machine 321 detects that a management frame does not conform to the specified IEEE 802.3u frame template. |
| cmp_regid | Asserted to indicate that all of the bits from the REGAD field 225 have been captured from the MDIO 208 and are available for decoding on the regid[4:0] outputs. |
| port_0_reg | Asserted when the PHYAD field 224 matches the address of the first physical layer device 201$_1$. |
| port_1_reg | Asserted when the PHYAD field 224 matches the address of the second physical layer device 201$_2$. |
| port_2_reg | Asserted when the PHYAD field 224 matches the address of the third physical layer device 201$_3$. |
| port_3_reg | Asserted when the PHYAD field 224 matches the address of the fourth physical layer device 201$_4$. |
| regid[4:0] | Provides the data in the REGAD field 224. |
| inv_phyid | Asserted when the PHYAD field 224 does not match the address of any physical layer device 201 in the transceiver 200. |
| inv_regid | Asserted when the REGAD field 225 does not match the address of any data storage elements in the management data storage unit 322. |

One with ordinary skill in the art will recognize that the number of port_0_reg through port_3reg outputs may be expanded or reduced based upon the number of physical layer devices 201 in the transceiver 200.

Figure 8:
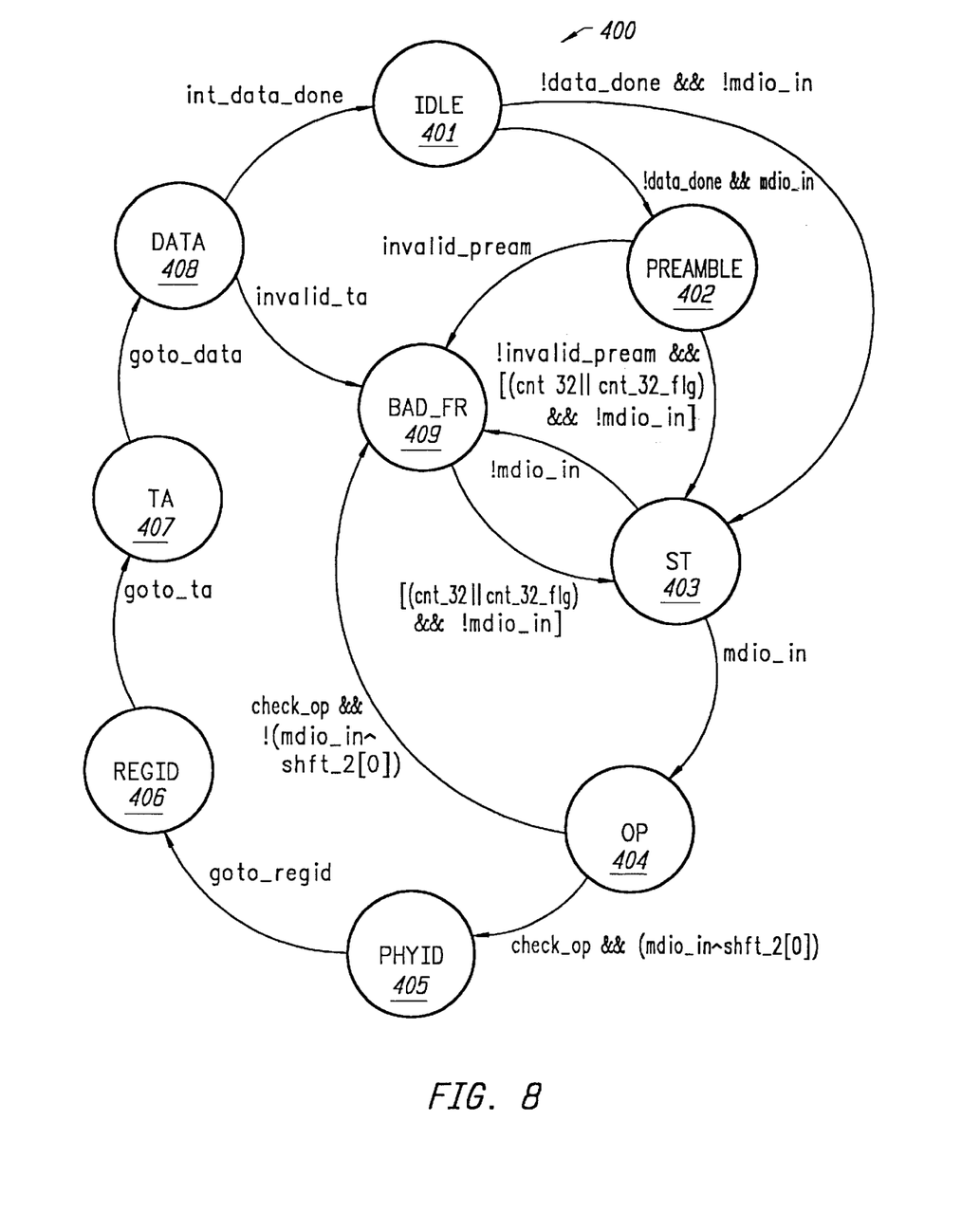
FIG. 8 illustrates a state diagram for one embodiment of the management frame state machine in FIG. 7.

FIG. 8 illustrates a state diagram 400 for the management frame state machine 321 in FIG. 7. Further, Appendix A provides a Verilog functional description of the management frame state machine 321 having the state diagram 400 illustrated in FIG. 8. Using Verilog design tools, one with ordinary skill in the art will be able to have the functional description appearing in Appendix A converted to circuitry that forms an embodiment of the management frame state machine 321 having the state diagram shown in FIG. 8.

The state diagram 400 in FIG. 8 will now be described. In describing the state diagram 400, the state transitions will be explained with respect to events that are ascertained by examining data in a management frame 220. The signal names and logic equations appearing in state diagram 400, which cause the state transitions, will be more fully described with reference to Appendix A.

The management frame state machine 321 may begin in an IDLE state 401 and remain there until the management frame state machine 321 detects that a preamble field 221 of a management frame is beginning to be received at the MDIO input/output 339. Once the beginning of the preamble field 221 is detected; the state machine 321 transitions to a PREAMBLE state 402. Alternatively, the state machine 321 may transition to a ST state 403, if the ST field 222 of a management frame 220 is provided to the MDIO input/output 339. This may occur when the management frame 220 does not include a preamble field 221.

In the PREAMBLE state 402, the state machine 321 monitors the mdio_in input to determine if thirty two consecutive logic 1 values have been received on the MDIO input/output 339. After receiving thirty two consecutive logic 1 values and the first logic 0 value bit of the ST field 222, the state machine 321 transitions to the ST state 403. If a logic 0 value is detected on the MDIO input/output 339 before the preamble field 221 is completed, the state machine 321 transitions to a BAD_FR state 409. The BAD_FR state 409 is entered because a logic 0 value in the preamble field 221 indicates that the incoming management frame 220 does not conform to the IEEE 802.3u specified frame template.

In the ST state 403, the state machine 321 determines whether the second bit in the ST field 222 is a logic 1 value. If this bit is a logic 1 value, the state machine transitions to a OP state 404. Otherwise, the state machine transitions to the BAD_FR state 409, because the incoming management frame 220 does not conform to the required template.

In the OP state 404, the state machine 321 determines whether the OP field 223 has been received on the MDIO input/output 339 and whether the OP field 223 contains a valid bit pattern. If the received OP field 223 has a logic value 01 or 10 bit pattern, (with the left most bit value being the first bit received by the MDIO input/output 339) the state machine 321 transitions to a PHYID state 405. If the received OP field 223 has a logic value 11 or 00 bit pattern, then the state machine 321 transitions to the BAD_FR state 409, because the management frame 220 is not in conformance with the required frame template.

In the PHYID state 405, the state machine 321 asserts either the op_rd or op_wr output, based upon the bit pattern in the OP field 223. The op_rd signal is asserted if the OP field 223 contains a logic value 10 bit pattern. The op_wr signal is asserted if the OP field 223 contains a logic value 01 bit pattern. The op_wr or op_rd signal will remain asserted until the io_reset input is asserted or the state machine enters the ST state 403. In either of these instances, both the op_rd and op_wr outputs will be deasserted.

The state machine 321 remains in the PHYID state 405 for the time that the MDIO input/output 339 is receiving the PHYAD field 224 of the management frame 220. Once the entire PHYAD field 224 has been received, the state machine 321 transitions to the REGID state 406.

The state machine 321 remains in the REGID state 406 until the entire REGAD field 225 of the incoming management frame 220 is received by the MDIO input/output 339. In the second mii_clk cycle in the REGID state 406, the port_0_reg, port_1_reg, port_2_reg, port_3_reg, and inv_phyid outputs become valid. The outputs are set based upon a comparison by the state machine of the received PHYAD field 224 with the m0_phyid_reg [4:0] through m3_phyid_reg [4:0] inputs. The port_0_reg, port_1_reg, port_2_reg, port_3_reg, and inv_phyid outputs remain valid until the io_reset input is asserted or the ST state 403 is entered. In both of these instances, the aforementioned outputs are all deasserted.

Once the entire REGAD field 225 of the management frame 220 is received, the state machine 321 transitions to a TA state 407. The state machine remains in the TA state until the entire TA field 226 of the incoming management frame 220 is transferred on the MDIO input/output 339. In the first mii_clk cycle in the TA state, the ta_cycle1 output is asserted to indicate that the first TA field 226 bit is being received. In the same mii_clk cycle, the cmp_regid output is asserted and the regid[4:0] outputs become valid. The cmp_regid output remains asserted until the io_reset input is asserted or the ST state 403 is entered. The regid[4:0] outputs remain valid until either the io_reset input is asserted or the ST state 403 is entered.

In a second mii_clk cycle in the TA state, the ta_cycle1 output is deasserted and the ta_cycle2 output is asserted to indicate that the second TA field 226 bit is being received. In the same mii_clk cycle, the inv_regid output becomes valid to indicate whether the REGAD field 225 value corresponded to any of the data storage element addresses in the management data storage unit 322. The inv_regid output remains unchanged until the io_reset input is asserted or the ST state 403 is entered. Once the entire TA field 226 is received, the state machine transitions to a DATA state 408.

In the DATA state 408, the man_data output is asserted, until the DATA state is exited, to indicate that the DATA field 227 portion of the management frame 220 has arrived. During the DATA state 408, the MII interface circuit 320 either performs a read operations, write operation, or no operation, in conformance with the IEEE 802.3u standard, based upon the values presented on the outputs of the state machine 321. If the inv_manfrm output is asserted, the transceiver 200 will not drive the MDIO input/output 339 during the DATA state 408.

During the first mii_clk cycle in the DATA state 408, the bits received from the TA field 226 are evaluated. If the op_wr output is asserted and TA field 226 bits are not a logic value 10 bit pattern, the state machine 321 will transition to the BAD_FR state. Otherwise, the state machine 321 will remain in the DATA state 408 until the entire DATA field 227 is transferred on the MDIO input/output 339. Once the last bit in the DATA field 227 has been transferred on the MDIO input/output 339, the state machine 321 transitions to the IDLE state 401. In the first mii_clk cycle in the IDLE state 401, the data_done output is asserted. In the second mii_clk cycle in the IDLE state, the data_done output is deasserted.

In the BAD_FR state 409, the state machine 321 will transfer to the ST state 403 once a valid preamble field 221 has been received on the MDIO input/output 339 and the first logic 0 value bit of the ST field 222 has been provided to the MDIO input/output 339. Otherwise, the state machine 321 remains in the BAD_FR state 409. This enables the management frame state machine 321 to exit the BAD_FR state 409 upon recognizing that a new management frame is being provided to the MDIO input/output 339. While in the BAD_FR state 409, the management frame state machine 321 asserts the inv_manfrm output.

Appendix A provides a Verilog functional description of a state machine 321 of the present invention, which implements the state diagram 400 shown in FIG. 8. In order to describe the Verilog functional description in Appendix A, the description has been divided into numbered segments 500–508, which will each be described. In segment 500, each of the signals in the functional model is defined as being either an output, input, wire (internal signal), register, or combination thereof. Also in segment 500, each of the state machine 321 states 401–409 is defined.

In segment 503, certain signals are assigned to be asserted when the state machine 321 is in a specified state. The man_pream signal is defined to be asserted when the state machine is in the PREAMBLE state 402. The man_st signal is defined to be asserted when the state machine 321 is in the ST state 403. The man_op signal is defined to be asserted when the state machine 321 is in the OP state 404. The man_phyid signal is defined to be asserted when the state machine 321 is in the PHYID state 405. The man_regid signal is defined to be asserted when the state machine 321 is in the REGID state 406. The man_ta signal is defined to be asserted when the state machine is in the TA state 407. The man_data signal is defined to be asserted when the state machine 321 is in the DATA state 408. The inv_manfrm signal is defined to be asserted when the state machine 321 is in the BAD_FR state 409.

In segment 501, an int_reset signal is assigned the value provided on the io_reset input. In segment 502, the transition conditions for each state 401–409 in the state machine 321 are specified. All state transitions are specified to take place on the rising edge of the mii_clk input. When the int_reset signal is asserted, the state machine 321 transitions to the IDLE state 401. When the state machine 321 is in the IDLE state 401 and the data_done signal is not asserted and the mdio_in signal is a logic 1 value, the state machine 321 transitions to the PREAMBLE state 402. When in the IDLE state 401 and the data_done signal is not asserted and the mdio_in signal is a logic 0 value, the state machine 321 transitions to the ST state 403. Otherwise, the state machine 321 remains in the IDLE state 401.

When the state machine 321 is in the PREAMBLE state 402 and the invalid_pream signal is asserted, the state machine 321 transitions to the BAD_FR state 409. When the invalid_pream signal is not asserted and the state machine is in the PREAMBLE state 402 and the mdio_in is a logic 0 value and either the cnt_32 signal is asserted or the cnt_32_flg signal is asserted, the state machine 321 transitions to the ST state 403. Otherwise, the state machine 321 remains in the PREAMBLE state 402. As a result, the ST state 403 is entered after the first bit in the ST field 222 is received by the MDIO input/output 339.

Segment 504 defines the invalid_pream, cnt_32, and cnt_32_flg signals. A pream_cntr is defined in segment 500 as a seven bit register. The pream_cntr may be loaded or incremented at each rising edge of the mii_clk. The pream_cntr is set to a logic 0 value, if the int_reset signal is asserted or the mdio_in signal is a logic 0 value. Otherwise, the pream_cntr is incremented by one if the mdio_in signal is a logic 1 value. The cnt_32 signal is asserted when the pream_cntr reaches a value of 32 (20 hexadecimal). The cnt_32_flg signal is set on each rising edge of the mii_clk input. If the int_reset is asserted or the state machine 321 is in the ST state 402, the cnt_32_flg signal is set to a logic 0 value. Otherwise, if the cnt_32 signal is asserted, the cnt_32_flg signal is asserted to a logic 1 value. The invalid_pream signal is asserted when the state machine 321 is in the PREAMBLE state 402 and the mdio_in signal is a logic 0 value and neither cnt_32 nor cnt_32_flg is asserted.

As shown in segment 502 the state machine 321 transitions out of the ST state 403 and into the OP state when the mdio_in signal is a logic 1 value. If the mdio_in signal is a logic 0 value, the state machine 321 transitions to the BAD_FR state 409, since a logic 0 value indicates that the management frame 220 does not conform to the IEEE 802.3 frame template.

Once the state machine 321 is in the OP state 404, the state machine 321 transitions to the PHYID state if the mdio_in signal has a logic value different than the shft_2[0] signal and the check_op signal is asserted. The mdio_in and shft_2[0] are different when the OP field 223 contains either a logic value 01 or 10 bit pattern. If the mdio_in signal and shft_2[0] are not dissimilar and check_op is asserted, the OP field 223 is not in conformance with the required frame template, and the state machine 321 transitions to the BAD_FR state 409. Otherwise, the state machine 321 remains in the OP state 404.

Segment 505 defines the operation of the shft_2[2:0], invalid_op, op_wr, op_rd, and check_op signals. The shft_2[2:0] is a three bit register value that is either loaded or shifted at the rising edge of the mii_clk. If int_reset is asserted or the state machine 321 is in the ST state 403, shft_2[2:0] is loaded with a logic value 001 bit pattern, so that shft_2[0] is 1, shft_2[1] is 0, and shft_2[2] is 0. If the state machine 321 is in the OP state 404, which lasts for two mii_clk cycles, shft_2[2:0] is shifted, so that shft_2[1] is shifted into shft_2[2], shft_2[0] is shifted into shft_2[0] and shft_2[0] is loaded with mdio_in. During the second mii_clk cycle in the OP state 404, which is the last mii_clk cycle in the OP state 404, shft_2[0] contains the first bit in the OP field 223 and mdio_in is the second bit in the OP field 223.

The check_op signal is asserted when shft_2[1] is a logic 1 value and the state machine is in the OP state 404. This condition is true during the second mii_clk cycle in the OP state 404. The invalid_op signal is asserted when shft_2[2] is a logic 1 value and shft_2[] and shft_2[0] are the same logic value. The op_wr signal is asserted when the shft_2[2] is a logic 1 value and the shft_2[1] is a logic 0 value and the shft_2[0] is a logic 1 value. The op_rd signal is asserted when the shft_2[2] is a logic 1 value and the shft_2[] is a logic 1 value and the shft_2[0] is a logic 0 value. The shft_2[2:0] shifts for the last time when the state machine 321 transitions out of the OP state 404. At this instance, the op_wr, op_rd, and invalid_op signals are set for the incoming management frame 220.

As shown in segment 502, the state machine 321 transitions from the PHYID state 405 to the REGID state 406 when the goto_regid signal is asserted. Otherwise, the state machine 321 remains in the PHYID state 405. The state machine transitions from the REGID state 406 to the TA state 407 when the go_ta signal is asserted. Otherwise, the state machine 321 remains in the REGID state 406. Once in the TA state 407, the state machine 321 transitions to the DATA state 408 when the goto_data signal is asserted. Otherwise, the state machine 321 remains in the TA state 407.

Segment 506 shows the logic operations that are associated with the PHYID state 405 and REGID state 406. The shft_11[10:0] is an eleven bit register value. The shft_11[10:0] is either shifted or loaded on the rising edge of the mii_clk input. When either int_reset is asserted or the state machine 321 is in the ST state 403, the shft_11[10:0] is loaded with a logic value 00000000001 bit pattern. Otherwise, if the state machine 321 is in either the PHYID state 405 or the REGID state 406, the shft_11[10:0] is shifted in the same manner that shft_2[2:0] is shifted.

The goto_regid signal is asserted when the state machine 321 is in the PHYID state 405 and the shft_11[4] bit is set to a logic 1 value. The goto_ta signal is asserted when the state machine 321 is in the REGID state 406 and the shft_11[9] bit is a logic 1 value. Upon entering the TA state 406, the PHYAD field 224 will be contained in shft_11[9:5] and the REGID field 225 will be contained in shft_11[4:0].

A man_phyid_dly signal is defined as being set at the rising edge of each mii_clk input. If int_reset is asserted, the man_phyid_dly is deasserted to a logic 0 value. Otherwise, the man_phyid_dly signal is loaded with the man_phyid signal value. A port_0 signal is asserted when shft_11[4:0] contains the value on the m0_phyid_reg inputs. A port_1 signal is asserted when shft_11[4:0] contains the value on the m1_phyid_reg inputs. A port_2 signal is asserted when shft_11[4:0] contains the value on the m2_phyid_reg inputs. A port_3 signal is asserted when shft_11[4:0] contains the value on the m3_phyid_reg inputs. An int_inv_phyid signal is asserted when the io_cs_1 input is a logic 1 value and man_phyid_dly is asserted and shft_11[5] is a logic 1 value and neither port_0, port_1, port_2, nor port_3 is asserted.

The inv_phyid output is set at the rising edges of the mii_clk signal. If the int_reset signal is asserted or the state machine 321 is in the ST state 403, inv_phyid is deasserted to a logic 0 value. Otherwise, if int_inv_phyid is asserted, inv_phyid is asserted.

The inv_regid output is also set at the rising edges of the mii_clk signal. If the int_reset is asserted or the state machine 321 is in the ST state 403, inv_regid is set to a logic 0 value. Otherwise, if the reg_nomatch input is asserted and the ta_cycle1 output is asserted, the inv_regid output is asserted.

The port_0_reg, port_1_reg, port_2_reg, and port_3_reg outputs are each set on rising edges of the mii_clk input. If the int_reset signal is asserted or the state machine 321 is in the ST state 403, each of these outputs is deasserted to a logic 0 value. Otherwise, if the man_phyid_dly signal is asserted, port_0_reg is loaded with the value in port_0, port_1_reg is loaded with the value in port_1, port_2_reg is loaded with the value in port_2, and port_3_reg is loaded with the value in port_3.

The cmp_regid output is set on each rising edge of the mii_clk signal. If the int_reset signal is asserted or the state machine 321 is in the ST state 403, the cmp_regid output is set to a logic 0 value. Otherwise, if go_ta is asserted, cmp_regid is asserted to a logic 1 value. The regid[4:0] output is set to a logic value 00000 if cmp_regid is a logic 0 value, but regid[4:0] is set to the value in shft_11[4:0] if cmp_regid is asserted to a logic 1 value.

Segment 507 defines the operation of the signals associated with the TA state 407. The shft_3[2:0] is a three bit register value. On the rising edges of the mii_clk input, shft_3[2:0] may be either loaded or shifted. If int_reset is asserted or go_data is asserted, the shft_3[2:0] is loaded with a logic value 001 bit pattern. Otherwise, if the state machine 321 is in the TA state 407, the shft_3[2:0] is shifted in the same manner as shft_2[2:0], except that shft_3[0] is loaded with the logical AND of the op_wr output and the mdio_in input. The goto_data signal is asserted when shft_3[1] is a logical 1 value, which will first occur after the first mii_clk cycle in the TA state 407.

The ta_cycle1 output is asserted when the state machine 321 is in the TA state 407 and the shft_3[0] is a logic 1 value. The ta_cycle2 output is asserted when the state machine 321 is in the TA state 406 and the shft_3[1] is a logic 1 value. An invalid_signal is asserted when op_wr is asserted and shft_3[2] is a logic 1 value and either shft_3[1] is not a logic 1 value or shft_3[0] is not a logic 0 value. This indicates that the management packet does not conform to the specified IEEE 802.3u frame template, since the TA field 226 does not have the proper bit pattern for a write operation.

As shown in Segment 502, the state machine 321 transitions from the DATA state 408 to the BAD_FR state 409 when invalid_ta is asserted. Otherwise, if int_data_done is asserted, the state machine 321 transitions from the DATA state 408 to the IDLE state 401. When neither invalid data nor int_data_done is asserted, the state machine remains in the DATA state 408. Segment 508 defines the operation of the signals associated with the DATA state 408.

A data_cntr is defined to be a five bit register that is either loaded or incremented at the rising edges of the mii_clk input. If the int_reset is asserted or an int_data_done signal is asserted, the data_cntr is loaded with a logical 0 value Otherwise, if the state machine 321 is in the DATA state 408, the data_cntr is incremented by one. The int_data_done signal is asserted when the state machine 321 is in the DATA state 408 and the value in the data_cntr is 15 (1111 binary). The data_done output is set at each rising edge of the mii_clk input, and if the int_reset is asserted, the data_done output is set to a logical 0 value. Otherwise, the data_done output is loaded with the value of the int_data_done signal.

As shown in segment 502, the state machine 321 transitions from the BAD_FR state 409 to the ST state 403 when mdio_in is a logical 0 value and either cnt_32 or cnt_32_flg is asserted. Otherwise, the state machine 321 remains in the BAD_FR state. This provides for the state machine 321 to transition out of the BAD_FR state 409 upon recognizing that a new management frame is being transmitted on a management bus coupled to the MDIO input/output 339.

The station management circuit 202 may be formed alone on an integrated circuit. The station management circuit 202 may also be formed on an integrated circuit along with one or more physical layer devices to form a transceiver. Further, the station management circuit 202 may be formed on an integrated circuit along with one or more physical layer devices and a repeater unit to form a repeater set.

Although the invention has been described above with particularity, this was merely to teach one of ordinary skill in the art to make and use the invention. Many modifications will fall within the scope of the invention, as that scope is defined by the following claims.

APPENDIX A
VERILOG FUNCTIONAL DESCRIPTION OF A MANAGEMENT
FRAME STATE MACHINE CIRCUIT

```
Seqment 500
module m_frmsm(
                              mii_clk,
                              io_reset,
                              mdio_in,
                              m0_phyid_reg,
                              m1_phyid_reg,
                              m2_phyid_reg,
                              m3_phyid_reg,
                              io_cs_1,
                              reg_nomatch,
                              ta_cycle1, // outputs
                              ta_cycle2,
                              man_ta,
                              op_rd,
                              op_wr,
                              regid,
                              man_data,
                              data_done,
                              cmp_regid,
                              inv_manfrm,
                              inv_phyid,
                              inv_regid,
                              port_0_reg,
                              port_1_reg,
                              port_2_reg,
                              port_3_reg);
input                         mii_clk;
input                         mdio_in,
                              io_reset,
                              reg_nomatch,
                              io_cs_1;
input         [4:0]           m0_phyid_reg;
input         [4:0]           m1_phyid_reg;
input         [4:0]           m2_phyid_reg;
input         [4:0]           m3_phyid_reg;
output                        ta_cycle1,
                              ta_cycle2,
                              op_rd,
                              op_wr,
                              man_ta,
                              man_data,
                              data_done,
                              inv_manfrm,
                              cmp_regid,
                              port_0_reg,
                              port_1_reg,
                              port_2_reg,
                              port_3_reg;
output        [4:0]           regid;
output                        inv_phyid;
output                        inv_regid;
reg                           inv_phyid;
reg                           inv_regid;
wire                          ta_cycle1;
wire                          ta_cycle2;
wire                          op_rd,
                              op_wr,
                              int_clk;
wire                          man_data;
wire          [4:0]           regid;
reg                           cmp_regid;
reg                           port_0_reg,
                              port_1_reg,
                              port_2_reg,
                              port_3_reg;
wire                          int_reset;
wire                          int_inv_phyid;
wire                          invalid_op,
                              valid_phyid,
                              cnt_32,
                              cnt_5,
                              goto_data,
                              invalid_ta;
reg           [6:0]           pream_cntr;
reg           [4:0]           data_cntr;
reg           [2:0]           shft_2;
reg           [2:0]           shft_3;
reg           [10:0]          shft_11;
wire                          invalid_pream,
                              man_pream,
                              man_st ,
                              man_op ,
                              man_phyid ,
                              man_regid ,
                              man_ta ,
                              inv_manfrm ,
                              goto_regid,
                              check_op,
                              goto_ta;
reg                           cnt_32_flg;
reg                           man_phyid_dly;
reg           [3:0]           state;
wire                          port_0,
                              port_1,
                              port_2,
                              port_3;
wire                          int_data_done;
reg                           data_done;
parameter                     DLY = 5;
// State parameters
    parameter    [3:0]        IDLE       = 4'h0,
                              PREAMBLE   = 4'h1,
                              ST         = 4'h3,
                              OP         = 4'h4,
                              PHYID      = 4'h5,
                              REGID      = 4'h6,
                              TA         = 4'h7,
                              DATA       = 4'h8,
                              BAD_FR     = 4'h9;
Segment 501 assign #DLY int_reset = io_reset;
Segment 502 always @( posedge mii_clk)
begin
  if ( int_reset )
    state <= #DLY IDLE;
  else
  begin
    case ( state)
    IDLE:
      if ( !data_done)
      begin
        if ( mdio_in)
          state <= #DLY PREAMBLE ;
        else
          state <= #DLY ST;
      end
      else
        state <= #DLY IDLE;
    PREAMBLE:
      if ( invalid_pream)
        state <= #DLY BAD_FR;
      else if ( ( (cnt_32 || cnt_32_flg) && !mdio_in )
        state <= #DLY ST;
      else
        state <= #DLY PREAMBLE;
    ST:
      if (mdio_in)
        state <= #DLY OP;
      else
        state <= #DLY BAD_FR;
    OP:
      if ( check_op)
      begin
        if ( mdio_in shft_2[0])
          state <= #DLY PHYID;
        else
          state <= #DLY BAD_FR;
      end
```

APPENDIX A
VERILOG FUNCTIONAL DESCRIPTION OF A MANAGEMENT FRAME STATE MACHINE CIRCUIT

```
            else
                state <= #DLY OP;
        PHYID:
            if ( goto_regid)
                state <= #DLY REGID;
            else
                state <= #DLY state;
        REGID:
            if (goto_ta)
                state <= #DLY TA;
            else
                state <= #DLY state;
        TA:
            if (goto_data)
                state <= #DLY DATA;
            else
                state <= #DLY state;
        DATA:
            if (invalid_ta)
                state <= #DLY BAD_FR;
            else if ( int_data_done )
                state <= #DLY IDLE;
            else
                state <= #DLY state;
        BAD_FR:
            if ( ( cnt_32 || cnt_32_flg ) && !mdio_in )
                state <= #DLY ST;
            else
                state <= #DLY state;
        default:
            state <= #DLY IDLE;
        endcase
    end // end if
Segment 503 assign #DLY   man_pream    = state  == PREAMBLE;
assign #DLY   man_st       = state  == ST ;
assign #DLY   man_op       = state  == OP ;
assign #DLY   man_phyid    = state  == PHYID;
assign #DLY   man_regid    = state  == REGID;
assign #DLY   man_ta       = state  == TA;
assign #DLY   man_data     = state  == DATA;
assign #DLY   inv_manfrm   = state  == BAD_FR ;
Segment 504 always @ (posedge mii_clk)
begin
    if ( int_reset || !mdio_in )
        pream_cntr <= #DLY 7'b0000_000;
    else if ( mdio_in )
        pream_cntr <= #DLY pream_cntr + 1 ;
end
assign #DLY cnt_32 = (pream_cntr == 6'h20) ;
always @ (posedge mii_clk)
begin
    if ( int_reset || man_st )
        cnt_32_flg <= #DLY 1'b0;
    else if ( cnt_32)
        cnt_32_flg <= #DLY 1'b1;
end
assign #DLY invalid_pream = man_pream && !mdio_in
  && !( cnt_32 || cnt_32_flg ) ;
Segment 505 always @(posedge mii_clk)
begin
    if ( int_reset || man_st)
        shft_2 <= #DLY 3'b001;
    else if ( man_op )
    begin
        shft_2 [2] <= #DLY shft_2 [1];
        shft_2 [1] <= #DLY shft_2 [0];
        shft_2 [0] <= #DLY mdio_in;
    end
end
assign #DLY invalid_op = shft_2 [2] && !(shft_2[1] shft_2 [0]);
```

APPENDIX A
VERILOG FUNCTIONAL DESCRIPTION OF A MANAGEMENT FRAME STATE MACHINE CIRCUIT

```
assign #DLY op_wr = shft_2[2] && !shft_2[1] && shft_2[0];
assign #DLY op_rd = shft_2[2] && shft_2[1] && !shft_2[0];
assign #DLY check_op = shft_2 [1] && man_op ;
Segment 506 always @ (posedge mii_clk)
    begin
        if ( int_reset || man_st )
            shft_11 <= #DLY 11'b00000000001;
        else if ( man_phyid || man_regid )
        begin
            shft_11[10] <= #DLY shft_11[9];
            shft_11[9]  <= #DLY shft_11[8];
            shft_11[8]  <= #DLY shft_11[7];
            shft_11[7]  <= #DLY shft_11[6];
            shft_11[6]  <= #DLY shft_11[5];
            shft_11[5]  <= #DLY shft_11[4];
            shft_11[4]  <= #DLY shft_11[3];
            shft_11[3]  <= #DLY shft_11[2];
            shft_11[2]  <= #DLY shft_11[1];
            shft_11[1]  <= #DLY shft_11[0];
            shft_11[0]  <= #DLY mdio_in;
        end
    end
assign #DLY goto_regid = man_phyid && shft_11[4];
assign #DLY goto_ta = man_regid && shft_11[9];
always @( posedge mii_clk)
    if ( int_reset)
        man_phyid_dly <= #DLY 1'b0;
    else
        man_phyid_dly = #DLY man_phyid;
    assign #DLY port_0 = ( shft_11[4:0] == m0_phyid_reg );
assign #DLY port_1 = ( shft_11[4:0] == m1_phyid_reg );
assign #DLY port_2 = ( shft_11[4:0] == m2_phyid_reg );
assign #DLY port_3 = ( shft_11[4:0] == m3_phyid_reg );
assign #DLY int_inv_phyid =    io_cs_1 && man_phyid_dly &&
    shft_11[5] &&   (! ( port_0 || port_1 || port_2 || port_3 ) );
always @(posedge mii_clk)
begin
    if (int_reset || man_st)
        inv_phyid <= #DLY 1'b0;
    else if ( int_inv_phyid)
        inv_phyid <= #DLY 1'b1;
end
always @(posedge mii_clk)
begin
    if (int_reset || man_st)
        inv_regid <= #DLY 1'b0;
    else if ( reg_nomatch && ta_cycle1)
        inv_regid <= #DLY 1'b1;
end
always @ ( posedge mii_clk)
begin
    if ( int_reset || man_st)
    begin
        port_0_reg <= #DLY 1'b0;
        port_1_reg <= #DLY 1'b0;
        port_2_reg <= #DLY 1'b0;
        port_3_reg <= #DLY 1'b0;
    end
    else if ( man_phyid_dly)
    begin
        port_0_reg <= #DLY port_0;
        port_1_reg <= #DLY port_1;
        port_2_reg <= #DLY port_2;
        port_3_reg <= #DLY port_3;
    end
end
always @( posedge mii_clk)
begin
    if ( int_reset || man_st)
        cmp_regid <= #DLY 1'b0;
    else if ( goto_ta)
        cmp_regid <= #DLY 1'b1;
end
assign #DLY regid = ( cmp_regid ) ? shft_11[4:0]: 5'b00000 ;
```

-continued

APPENDIX A
VERILOG FUNCTIONAL DESCRIPTION OF A MANAGEMENT
FRAME STATE MACHINE CIRCUIT

Segment 507

```
always @(posedge mii_clk)
begin
    if ( int_reset || goto_data)
        shft_3 <= #DLY 3'b001 ;
    else if ( man_ta )
    begin
        shft_3[2] <= #DLY shft_3 [1]
        shft_3[1] <= #DLY shft_3 [0];
        shft_3[0] <= #DLY ( op_wr && mdio_in ) ;
    end
end
assign #DLY goto_data = shft_3[1];
assign #DLY invalid_ta = op_wr && shft_3[2] && !(shft_3[1] &&
!shft_3[0]);
assign #DLY ta_cycle1 = man_ta && shft_3[0] ;
assign #DLY ta_cycle2 = man_ta && shft_3[1] ;
```

Segment 508

```
always @(posedge mii_clk)
begin
    if ( int_reset || int data_done )
        data_cntr <= #DLY 4'b0000;
    else if (man_data)
        data_cntr <= #DLY data_cntr + 1;
end
assign #DLY int_data_done = (man_data) && (data_cntr == 4'b1111);
always @(posedge mii_clk)
begin
    if ( int_reset )
        data_done <= #DLY 1'b0;
    else
        data_done <= #DLY int_data_done;
end
endmodule // m_frmsm
```

What is claimed is:

1. A method for detecting bad management frames on a management bus coupled to a transceiver for carrying management frames, said method comprising the steps of:
   (a) detecting that a first management frame is on said management bus;
   (b) determining whether said first management frame conforms to a frame template;
   (c) asserting an indication that said first management frame is a bad management frame if it is determined in said step (b) that said first management frame does not conform to said frame template; and
   (d) deasserting said indication in response to recognizing a predetermined set of bits being transmitted on said management bus,
      wherein said predetermined set of bits is included in a second management frame on said management bus, and
      wherein said indication is deasserted, regardless of a physical layer device address provided in said second management frame.

2. The method of claim 1, wherein said predetermined set of bits includes a preamble field of said second management frame on said management bus.

3. The method of claim 1, wherein said predetermined set of bits includes thirty two contiguous bits each having a logical 1 value.

4. The method of claim 1, wherein said step (b) includes determining whether a preamble field in said first management frame contains a logical 0 value.

5. The method of claim 1, wherein said step (b) includes determining whether a second bit in a start of frame field in said first management frame is a logic 0 value.

6. The method of claim 1, wherein said step (b) includes determining whether a pair of bits in an operation code field in said first management frame are a same logic value.

7. The method of claim 1, wherein said step (b) includes determining whether a set of bits in a turnaround field in said first management frame conform to a specified pattern for indicating a write operation.

8. The method of claim 1, further comprising the step of:
   (e) preventing a data line on said management bus from being driven, if it is determined in said step (b) that said first management frame does not conform to said frame template.

9. The method of claim 8, further comprising the step of:
   (f) ceasing to prevent said data line on said management bus from being driven, in response to recognizing a predetermined set of bits being transmitted on said management bus.

10. The method of claim 1, wherein a data pin separate from a data pin receiving the management frame is not used to deassert said indication.

11. A station management circuit, wherein said station management circuit is coupleable to a set of physical layer devices and a management bus that transmits management frames, said station management circuit comprising:
   a means for recognizing that a first management frame is on said management bus;
   a means for determining whether said first management frame conforms to a frame template;
   a means for asserting an indication that said first management frame is determined to not be in conformance with said frame template, if said means for determining determines that said first management frame does not conform to said frame template; and
   a means for deasserting said indication in response to receiving a predetermined set of bits from said management bus,
      wherein said predetermined set of bits is included in a second management frame on said management bus, and
      wherein said means for deasserting deasserts said indication, regardless of a physical layer device address provided in said second management frame.

12. The station management circuit of claim 11, wherein said predetermined set of bits includes a preamble field in a second management frame.

13. The station management circuit of claim 11, wherein said predetermined set of bits includes thirty two contiguous bits each having a logic 1 value.

14. The station management circuit of claim 11, wherein said means for determining whether said first management frame conforms to said frame template includes means for determining whether a preamble field in said first management frame contains a logic 0 value.

15. The station management circuit of claim 11, wherein said means for determining whether said first management frame conforms to said frame template includes means for determining whether a second bit in a start of frame field in said first management frame is a logical 0 value.

16. The station management circuit of claim 11, wherein said means for determining whether said first management frame conforms to said frame template includes means for determining whether a pair of bits in an operation code field in said first management frame are a same logical value.

17. The station management circuit of claim 11, wherein said means for determining whether said first management frame conforms to said frame template includes means for determining whether a set of bits in a turnaround field in said first management frame conform to a specified pattern for indicating a write operation.

18. A transceiver for receiving information from a medium and transmitting information to the medium, said transceiver being coupleable to a management bus carrying management frames, said transceiver comprising:
   a physical layer device having a first interface coupleable to said medium and a second interface for providing network status information; and
   a station management circuit having a first set of inputs coupled to said second interface and a second set of inputs coupled for receiving said management frames from said management bus, wherein said station management circuit determines whether management frames received on said second set of inputs are in conformance with a frame templates,
   wherein said station management circuit enters a bad frame state upon determining that a first management frame received on said second set of inputs does not conform to said frame template, and
   wherein said station management circuit transitions out of said bad frame state upon determining that a second management frame following said first management frame is being received on said second set of inputs, regardless of a physical layer device address provided in said second management frame.

19. The transceiver of claim 18, wherein said station management circuit determines that said second management frame is being received on said second set of inputs by recognizing a predetermined set of bits received on said second set of inputs.

20. The transceiver of claim 19, wherein said predetermined set of bits includes a bit pattern for a preamble field in a management frame.

21. The transceiver of claim 20, wherein said predetermined set of bits of the preamble comprises thirty two contiguous logic 1 values.

22. The transceiver of claim 18, wherein said station management circuit further includes a set of outputs coupleable to said management bus for providing data on said management bus,
   wherein said station management circuit inhibits transmission of data on said set of outputs upon determining that said first management frame received on said second set of inputs does not conform to said frame template, and
   wherein said station management circuit ceases inhibiting transmission of data on said set of outputs upon determining that a predetermined set of bits following said first management frame is being received on said second set of inputs.

* * * * *